March 2, 1965

W. L. KIBLER 3,171,153

CONTROL DEVICE FOR WINDSHIELD CLEARING SYSTEM

Filed Nov. 14, 1963

INVENTOR.
WILLIS L. KIBLER

BY *Rudolph L. Lowell*

ATTORNEY.

March 2, 1965  W. L. KIBLER  3,171,153
CONTROL DEVICE FOR WINDSHIELD CLEARING SYSTEM
Filed Nov. 14, 1963  2 Sheets-Sheet 2
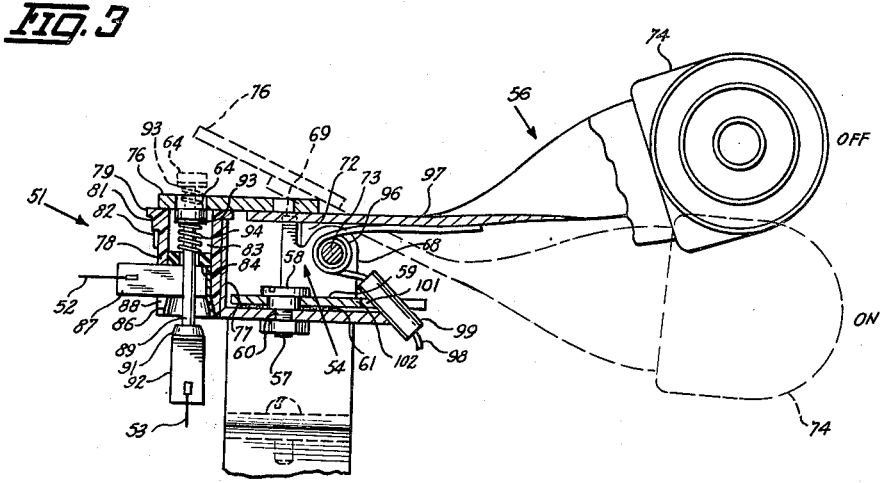
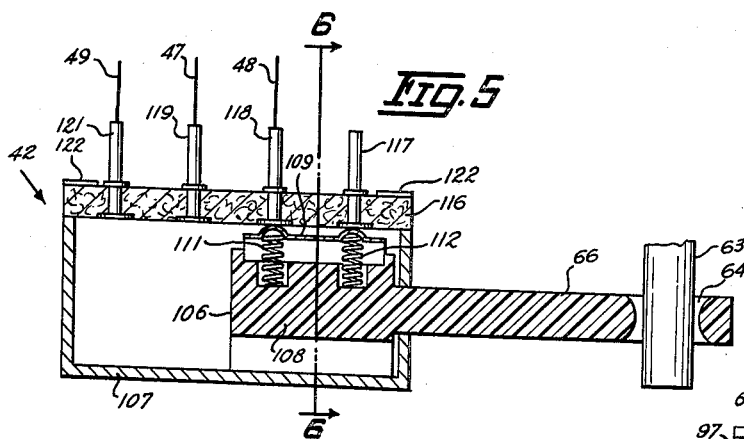
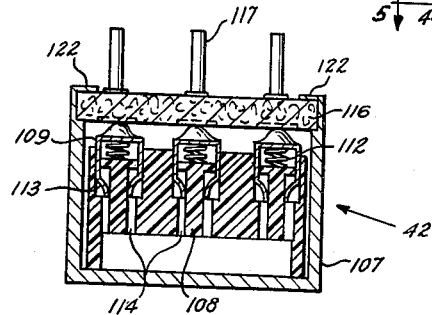
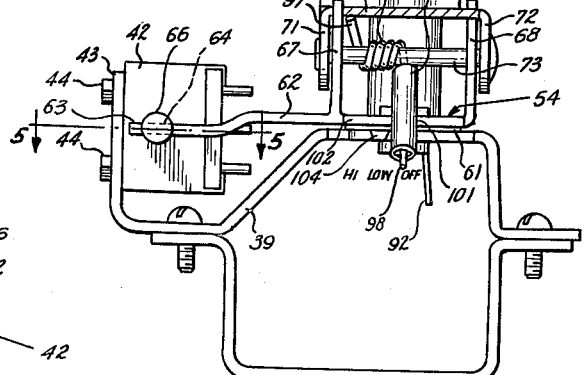
INVENTOR.
WILLIS L. KIBLER
BY Rudolph L. Lowell
ATTORNEY.

United States Patent Office 3,171,153
Patented Mar. 2, 1965

3,171,153
CONTROL DEVICE FOR WINDSHIELD CLEARING SYSTEM
Willis L. Kibler, Detroit, Mich., assignor to The Delman Company, Cookeville, Tenn., a corporation of Tennessee
Filed Nov. 14, 1963, Ser. No. 323,647
8 Claims. (Cl. 15—250.01)

This invention relates to a vehicle windshield cleaning system having a wiper unit and a washer unit. Particularly, the invention pertains to a control device for selectively or concurrently operating the wiper and washer units of a windshield cleaning system.

It is the object of the invention to provide in a windshield cleaning system an improved manually actuated control device operable to selectively or concurrently connect and disconnect a source of electric energy to the electric motors of the wiper and washer units.

A further object of the invention is to provide a foot actuated control device, common to the washing and wiper units of a windshield cleaning system for selectively or concurrently operating these units.

Another object of the invention is to provide a common control for two separate electric switches which is operable to sequentially move one of the switches to a plurality of positions.

An additional object of the invention is to provide for use with a windshield clearing system having a wiper unit and washer unit, a unitary manually actuated control device for the wiper and washer units which is economical and rugged in construction, reliable and effective in use, and capable of being foot operated so as to eliminate the necessity of the removal of a hand from the steering wheel.

These and other objects and advantages of this invention will become readily apparent from the consideration of the following detailed description and accompanying drawing in which:

FIG. 3 is an enlarged sectional view taken along the line 3—3 of FIG. 2;

FIG. 4 is an enlarged sectional view taken along the line 4—4 of FIG. 2;

FIG. 5 is an enlarged longitudinal sectional view taken along the line 5—5 of FIG. 4; and FIG. 6 is a sectional view taken along the line 6—6 of FIG. 5.

Figure 1:
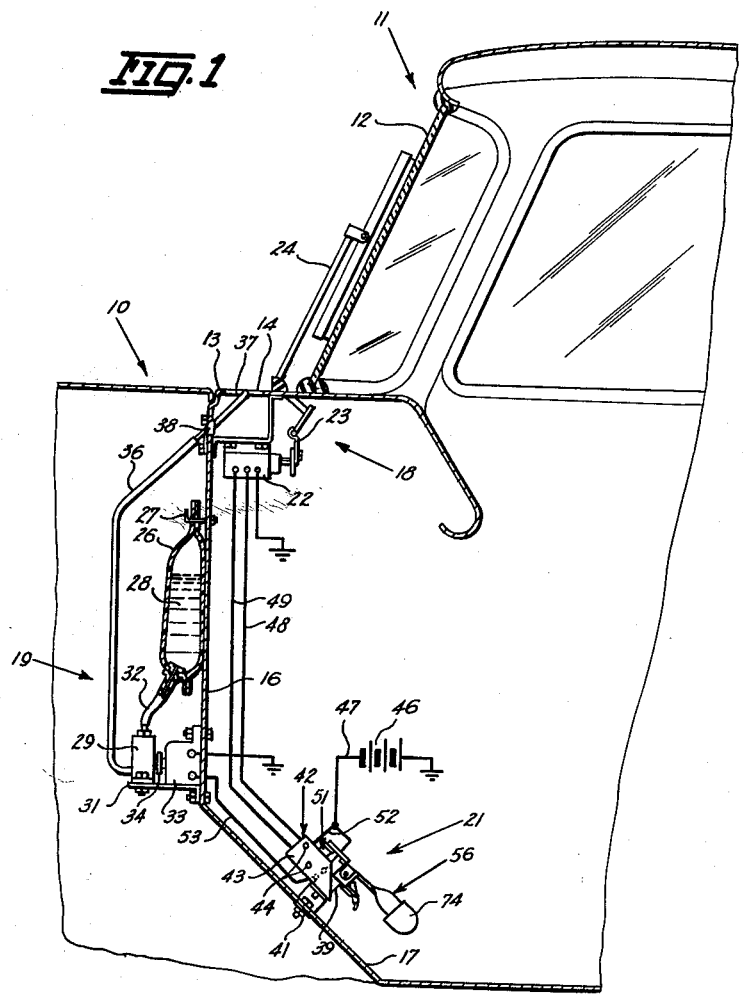
FIG. 1 is a fragmentary longitudinal sectional view of a vehicle showing a windshield clearing system embodying the control device of this invention.

With reference to the drawing, there is illustrated in FIG. 1 a windshield cleaning system 10 as applied to a vehicle 11 having a windshield 12, and an engine cowl 13 formed with heater and ventilating openings 14 extended forwardly from the lower edge of the windshield 12. A fire wall 16 is secured to the cowl 13 and extends downwardly therefrom terminating in a toe board section 17 which extends upwardly and forwardly from the floor of the vehicle.

The windshield cleaning system 10 has a wiper unit and a washer unit designated generally as 18 and 19, respectively. A foot actuated control device 21 mounted on the toe board section 17 is operable to selectively or concurrently operate the wiper and washer units.

The wiper unit 18 includes an electric wiper motor 22 mounted on the inner wall of the cowl 13. A motion transmitting linkage 23 drivably connects the motor 22 to a pair of wiper elements 24, one of which is shown. The electric motor 22 is a conventional two-speed motor and when energized drives the wiper element 24 in an oscillating path over the outer surface of the windshield 12.

The washer unit 19 includes a cleaning fluid container or reservoir 26 supported on the outside of the fire wall 16 by a bracket 27. Windshield cleaning fluid 28 is stored within the reservoir 26 and is removed from the reservoir 26 by a pump 29, of a rotary type, which is mounted on the fire wall 16 by a bracket 31. A hose 32 connected to the lower section of the reservoir 26 and the pump 29 provide a continuous supply of cleaning fluid to the pump.

An electric motor 33 is mounted on the fire wall 16 in axial alignment with the pump 29. The output shaft of the electric motor 33 is drivably connected to the pump 29 by an overload coupling 34 which functions to break the drive between the motor and the pump when the pump is stalled because of ice, dirt or mechanical malfunction. The pump 29 when operated discharges cleaning fluid under pressure into a hose 36 which is connected to nozzles 37, only one of which is illustrated. A washer clamp 38 adjustably mounts the nozzle 37 on the fire wall 16 so that the discharge end thereof is in alignment with one of the heater and ventilating openings 14 so as to direct a stream of cleaning fluid into the windshield 12 in the path of the reciprocating wiper element 24..

The control device 21 has a supporting base 39 secured to the toe board section 17 by bolts 41. A first switch 42 having three operating positions is secured to an upright side flange 43 of the supporting base 39 by bolts 44. A source of electric energy 46, such as a battery, is connected to the switch 42 by line 47. Lines 48 and 49 connect the switch 42 with the electric wiper motor 22.

A second switch 51 is mounted on the supporting base 39 and is connected to the source of electric energy by line 52 and to the washer motor 33 by a line 53. The switch 51 operates between on and off positions to connect and disconnect the battery 46 with the electric washer motor 33. The first switch 42 is operated in response to movement of a bell crank unit 54 which is pivotally mounted on the supporting base 39. The second switch 51 is operated in response to pivotal movement of a lever 56 which is pivotally mounted on the bell crank unit 54.

As shown in FIG. 3, a bolt 57 having a head 58 with a reduced diameter section 60 extends through the elbow section 59 of the bell crank unit and the supporting base 39 to pivotally mount the bell crank unit 54 for movement about the axis of the bolt 57. A thin washer 61 of lubricant material is interposed about the bolt 57 between the bell crank unit 54 and the supporting base 39.

Figure 2:
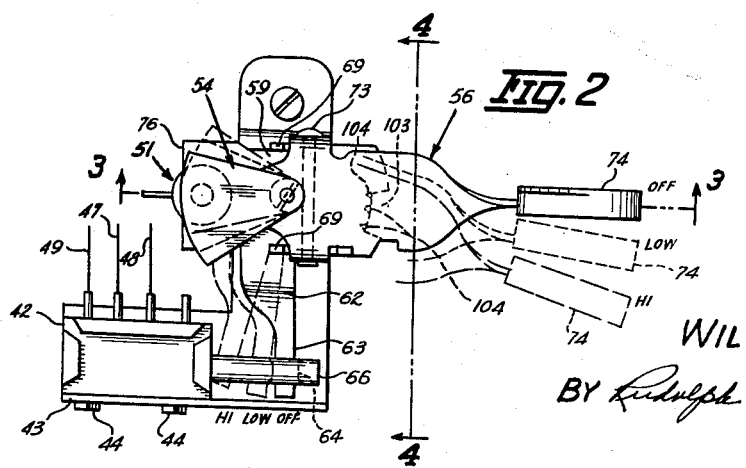
FIG. 2 is an enlarged plane view of the foot operated control device of FIG. 1.

Integrally formed with the elbow section 59 is a laterally extended arm 62 which is offset in a downward direction and terminates in a lateral finger 63. As shown in FIGS. 2 and 4, the finger 63 extends through a slot 64 in the end section of a control rod 66 for the switch 42. As best shown in FIG. 4 the bell crank unit 54 has a pair of upwardly extended legs 67 and 68 disposed on opposite sides of the pivotal axis defined by the bolt 57. Projected upwardly from the legs 67 and 68 are longitudinally spaced toes 69 which define stop positions for the lever 56.

The lever 56 has a pair of downwardly extended projections 71 and 72 which are positioned adjacent the opposite outside surfaces of the legs 67 and 68 and extend between the toes 69. A pin 73 extends transversely through the projections 71 and 72 and adjacent legs 67 and 68 to pivotally mount the lever 56 on the bell crank unit 54. The axis of the lever 56 is substantially perpendicular to the axis of rotation of the bell crank unit 54. As shown in FIG. 2, the lever 56 is twisted about 90° so as to terminate in a plane substantially parallel to the plane of the axis of the bolt 57. A rubber boot 74 is positioned about the end of the lever 56 so that it may be readily contacted by the foot of the operator. The end of the lever 56 opposite the boot 74 has a sector shaped extension 76 which is engageable with the switch 51 and operates to hold the switch in the open position.

As shown in FIG. 3, the switch 51 is retained in a tubular member 77 which is secured to the supporting base 39 and extends in a direction substantially parallel to the axis of the bolt 57. A cylindrical sleeve 78 formed from electrically insulated material is positioned in the tubular member 77. The sleeve 78 is provided with an annular top flange 79 which engages the top of the tubular member 77 and a longitudinal rib 81 which projects into a slit 82 in the side of the tubular member 77. The annular flange 79 limits the longitudinal movement of the cylindrical sleeve and the rib 81 limits the rotational movement of the sleeve relative to the tubular member 77.

The sleeve 78 has a longitudinal bore 83 which is countersunk at opposite ends so as to form a circular abutment 84 between the ends of the cylindrical sleeve 78. The countersunk bore in the lower section of the sleeve 78 tapers outwardly and has received therein a complementary shaped electrical contact 86 having a terminal 87 which is conductively connected to the line 52. The electrical contact 86 is of a circular shape having its lower end tapering in an outward direction so as to form a press fit in the lower countersunk portion of the bore 83. Extended laterally from the sleeve 78 through a slit 88 in the side of the sleeve 78 is a terminal 87. A rod 89 is slidably disposed in the bore 83 and has secured at its lower end a tapered movable electrical contact 91 and terminal 92. The terminal 92 is connected to the line 53. The upper end of the rod 89 includes a head 93 having a cap 64 of electrically insulated material and functions to retain a compression spring 94 in engagement with the abutment 84 thereby biasing the rod 89 and electrical contact 91 in an upward direction to a closed position.

As shown in FIG. 3, when the lever 56 is depressed or moved to the dotted line position the compression spring 94 will bias the rod 91 and carry the electric contact 91 into engagement with the electric contact 86 thereby connecting the battery 46 with the electric motor 33. The switch 51 will remain in the on position until the lever 56 is moved back to its initial position. The rod 89 is moved in a downward direction when the sector-shaped extension 76 applies a downward force on the head 93.

The lever 56 is normally in the off position and is retained in this position by a torsion spring 96 positioned about the pin 73. One end 97 of the torsion spring engages the lever 56 and the other end 98 carries a tubular sleeve 99 which bears against the supporting base 39.

The sleeve 99, as shown in FIGS. 3 and 4, extends through a slot 101 in the arm 102 of the bell crank unit 54. The sleeve 99 is biased by the spring 96 into a recess 103 having three angularly spaced notches 104 which determine the angular stop position of the bell crank unit 54. The sleeve 99 is a spring biased detent which functions to determine the index position of the bell crank unit 54. This index position determines the position of the finger 63 of the arm 62 thereby controlling the switching of the first switch 42.

As shown in FIG. 5, the control rod 66 is an integral extension of a contact carrier 106 which is slidably disposed in a box-shaped housing 107. The carrier 106 is formed from material having electrical insulating characteristics and has a longitudinally extended end-portion 108 retaining a movable electric contact element 109. A pair of springs 111 and 112 interposed between the carrier 106 and the contact element 109 bias the contact element away from the carrier. The movement of the contact element 109 relative to the carrier 106 is limited by inwardly bent sections 113 which coact with grooves 114 in the end-portion 108. The springs 111 and 112 bias the contact element 109 into engagement with a cover 116 of an electrical insulating material. The cover 116 is retained on the top of the box-shaped housing 107 by ears 122 which form an integral part of the housing and are bent over the top of the cover 116 as shown in FIG. 6. An array of longitudinally spaced electrical contacts 117, 118, 119 and 121 are secured in the cover 116 in longitudinal alignment. Adjacent contacts are sequentially connected and disconnected as the carrier 106 is moved longitudinally of the housing 107. The electric contacts 118 and 121 are connected to the lines 48 and 49 which lead to the wiper electric motor 22 and the electric contact 119 is connected to the battery line 47. The additional electrical contacts 117 and conductor elements 109 on the contact carrier 106 form part of an electrical circuit for operating the wiper motor 22 to move the wiper elements 24 to a park position.

In the operation of the windshield wiper unit 18, the lever 56 is foot operated in a transverse direction which moves the arm 62 pushing the control rod into the housing 107 of the switch 42. This movement positions the carrier so that the contact element 109 engages the electric contacts 118 and 119 thereby connecting the battery 46 to the electric motor 22. In the first or low position of the lever the tubular sleeve 99 is positioned in the first notch 104 to retain the electric contact element 109 in engagement with the electric contacts 118 and 119. In this position the electric motor 22 operates to drive the wiper elements over the windshield 12 at a slow rate of speed.

When the operator of the vehicle moves the lever 56 to the high position the electric contact element 109 engages the electric contacts 119 and 121. In this position the electric motor 22 operates at a high rate of speed and correspondingly increases the speed of the wiper element 24. To turn the wiper unit 18 off, the operator of the vehicle moves the lever 56 back to its initial or off position as shown in FIG. 2.

The wiper unit 18 is operated independently of the washer unit 19 as the sector shaped extension 76 of the lever 56 holds the second switch 51 in an open position during the transverse movement of the lever 56 for operation of the first switch 42. The torsion spring 96 continuously biases the lever 56 to hold the extension 76 in engagement with the second switch 51 to hold it in an open position The windshield washer unit 19 may be operated independently of the wiper unit 18 by merely depressing the lever 56 against the biasing force of the torsion spring 96 to move the lever in the "on" position as shown by the broken lines in FIG. 3. When the lever 56 is in the "on" position the compression spring 94 in the switch 51 moves the contact element 91 into engagement with the stationary contact element 86 thereby connecting the battery 46 to the electric motor 33. The energized motor 33 operates the fluid pump 29 to transfer windshield cleaning fluid 28 from the reservoir 27 under pressure to the nozzles 37 which discharge and direct the cleaning fluid onto the windshield 12.

The washer unit 19 can be operated conjointly with the wiper unit 18 at either speed of operation of the wiper motor 22. The operator of the vehicle moves the lever 56 in a transverse direction in either the low or high position and simultaneously depresses the lever to pivot the lever 56 about the pivot pin 73 thereby moving the lever 56 to its "on" position. With the lever 56 in this position the switches 42 and 51 are in a position to connect the battery 46 to the wiper electric motor 22 and to the washer electric motor 33 thereby concurrently operating the wiper element 24 and the pump 29.

When the operator of the vehicle removes his foot from the lever 56 the torsion spring 96 will rotate the lever 56 about the pin 73 and move the sector-shaped extension 76 to engagement with the head of the rod 89 thereby moving the contact 91 out of engagement with the contact 86. The motor 33 will be disconnected from the battery 46 and the electric motor 22 of the wiper unit will continue to operate until the lever 56 is moved transversely back to the "off" position.

In summary the foot actuated control device 21 is operable to selectively and concurrently connect and disconnect the battery 46 to the electric motor 22 of the wiper unit and the electric motor 33 of the washer unit. Control device 21 has a lever 56 pivoted about upright and transverse axes to control the operation of separate switches in response to separate pivotal movements of the lever about such axes.

While there have been shown, described, and pointed out the fundamental novel features of the invention as applied to the preferred embodiment, it is to be understood that various omissions, substitutions, changes in form, and details of the windshield clearing system illustrated may be made by those skilled in the art, without departing from the spirit of the invention. It is intended to be limited only as indicated by the scope of the following claims.

I claim:

1. A windshield cleaning system for a vehicle having a windshield and a source of energy comprising:
   (a) a wiper unit having a wiper element and motor means connected to the wiper element and operable to move the wiper element relative to the windshield,
   (b) a washer unit having a pump and motor means operable to transfer windshield cleaning fluid onto the windshield into the path of movement of the wiper element,
   (c) a control device operable to selectively or concurrently connect the motor means of the wiper and washer units with a source of energy, said device including
   (d) first means operable to connect and disconnect the wiper motor means and a source of energy,
   (e) second means operable to connect and disconnect the washer motor means and a source of energy,
   (f) operator movable means operably connected to said first and second means, and
   (g) means pivotally mounting said operator movable means for movement about a first axis and for movement about a second axis substantially normal to the first axis, said movable means in response to movement about the first axis actuating said first means and in response to movement about the second axis actuating said second means.

2. A windshield cleaning system for a vehicle having a windshield and a source of energy comprising:
   (a) a wiper unit having a wiper element and an electric motor connected to the wiper element and operable to move the wiper element relative to the windshield,
   (b) a washer unit having a pump and an electric motor operable to transfer windshield cleaning fluid onto the windshield into the path of movement of the wiper element,
   (c) a control device operable to selectively or concurrently connect the electric motors of the wiper and washer units with a source of energy, said device including
   (d) first switch means operable to connect and disconnect the wiper electric motor and a source of energy,
   (e) second switch means operable to connect and disconnect the washer electric motor and a source of energy,
   (f) operable movable means operably connected to said first and second switch means, and
   (g) means pivotally mounting said operator movable means for movement about a first axis and for movement about a second axis substantially normal to the first axis, said movable means in response to movement about the first axis actuating said first switch means and in response to movement about the second axis actuating said second switch means.

3. A windshield cleaning system for a vehicle having a windshield and a source of energy comprising:
   (a) a wiper unit having a wiper element and motor means connected to the wiper element and operable to move the wiper element relative to the windshield,
   (b) a washer unit having a pump and motor means operable to transfer windshield cleaning fluid onto the windshield into the path of movement of the wiper element,
   (c) a control device operable to selectively or concurrently connect the motor means of the wiper and washer units with a source of energy, said device including
   (d) first means operable to connect and disconnect the wiper motor means and a source of energy,
   (e) second means operable to connect and disconnect the washer motor means and a source of energy,
   (f) operator movable means operably connected to said first and second means, said movable means including
   (g) a bell crank having a center section, an arm operatively connected to said first means, and a lever arm operatively connected to said second means, said lever arm pivotally mounted on said center section for movement about an axis and operable in response to pivotal movement to actuate the second means, and
   (h) means pivotally mounting the center section of the bell crank on an axis substantially transverse to the pivotal axis of the lever arm, said second means being actuated in response to pivotal movement of the bell crank.

4. In combination with a windshield wiper unit including an electric motor, and a windshield washing unit including an electric motor,
   (a) a source of electric energy,
   (b) a first switch operable to connect and disconnect the washer motor and the source of electric energy,
   (c) a second switch movable to positions to connect and disconnect the wiper motor and the source of electric energy,
   (d) operator actuated control means for selectively and concurrently operating the first and second switch, said control means including
   (e) a bell crank having a center section, an arm operatively connected to said second switch, and a lever arm operatively connected to said first switch and pivotally mounted on said center section for movement about an axis, said first switch being actuated in response to the pivotal movement of the lever arm, and
   (f) means pivotally mounting the center section of the bell crank on an axis substantially transverse to the pivotal axis of the lever arm, said second switch being actuated in response to pivotal movement of the bell crank.

5. The combination defined in claim 4 including:
   (a) spring means having a first section engageable with said lever arm to bias said arm to a position for holding said first switch in a position to disconnect the washer motor and the source of electrical energy and a second section coacting with the bell crank to form a detent for indexing the positions of the second switch.

6. A control device comprising:
   (a) frame means,
   (b) a first switch mounted on said frame means and having control means movable to a plurality of positions,
   (c) a second switch mounted on said frame means and having a control means movable to an on and off position,
   (d) a bell crank having an arm connected to said first switch, (e) means pivotally mounting the bell crank on the frame means for movement about a first axis so that on rotation of said arm the control means of the first switch is moved to a plurality of positions, (f) a lever pivotally mounted on said bell crank for movement about a second axis substantially transverse to said first axis, said lever operably connected to said second control means to move the control means thereof in response to pivotal movement of said lever to the on and off positions, and (g) spring means having a first section engageable with said lever to bias said lever to hold the second switch in the off position and a second section coacting with said bell crank and frame means to form a detent for indexing the positions of the first switch.

7. The control device defined in claim 6 including:

(a) a tubular sleeve positioned about the second section of the spring means and engageable with notches in the frame means to define the angular position of the bell crank with respect to the frame means.

8. A control device comprising:

(a) frame means, (b) a first control means mounted on said frame means, (c) a second control means mounted on said frame means, (d) a bell crank having an arm connected to said first control means, (e) means pivotally mounting the bell crank on the frame means for movement about a first axis to move said arm to actuate the first control means, and (f) a lever pivotally mounted on said bell crank for movement about a second axis substantially transverse to said first axis, said lever operatively connected to said second control means so as to actuate said second control means in response to pivotal movement of said lever.

No references cited.